(12) United States Patent
Adapathya et al.

(10) Patent No.: US 7,161,758 B2
(45) Date of Patent: Jan. 9, 2007

(54) HARD DRIVE PROTECTION OVERRIDE

(75) Inventors: Ravi Adapathya, Cary, NC (US);
Ratan Ray, Cary, NC (US); Susumu Shimotono, Hadano (JP); Aaron Michael Stewart, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 266 days.

(21) Appl. No.: 10/987,672

(22) Filed: Nov. 12, 2004

(65) Prior Publication Data
US 2006/0103963 A1 May 18, 2006

(51) Int. Cl.
*G11B 19/04* (2006.01)
(52) U.S. Cl. .............. 360/69; 360/60; 360/75
(58) Field of Classification Search ............ None
See application file for complete search history.

(56) References Cited

U.S. PATENT DOCUMENTS

| | | | |
|---|---|---|---|
| 5,659,762 A | 8/1997 | Sawada et al. | |
| 5,978,922 A | 11/1999 | Arai et al. | |
| 6,012,146 A | 1/2000 | Liebenow | |
| 6,043,950 A | 3/2000 | Kim | |
| 6,330,624 B1 | 12/2001 | Cromer et al. | |
| 6,429,990 B1* | 8/2002 | Serrano et al. | 360/69 |
| 7,042,663 B1* | 5/2006 | Shimotono et al. | 360/69 |
| 2004/0252397 A1* | 12/2004 | Hodge et al. | 360/75 |
| 2005/0073764 A1* | 4/2005 | Ogawa et al. | 360/69 |
| 2006/0010340 A1* | 1/2006 | Makela et al. | 714/5 |

FOREIGN PATENT DOCUMENTS

WO  WO 99/22295 A2  5/1999

* cited by examiner

*Primary Examiner*—Hoa Thi Nguyen
*Assistant Examiner*—James L Habermehl
(74) *Attorney, Agent, or Firm*—Carlos Munoz-Bustamante; Dillon & Yudell LLP

(57) ABSTRACT

A method and system for overriding a hard drive Active Protection System (APS). APS automatically parks a read/write head and locks the platters in a Hard Disk Drive (HDD) in a notebook computer in response to a physical shock, such as when the computer is dropped from the user's lap or during intense vibration caused by air turbulence during a passenger flight. Rather than permanently disabling the APS off, the present invention permits a convenient method and system for temporarily suspending the operations of the APS, thus allowing the user to still access the HDD in conditions in which motion occurs yet physical shock is not necessarily imminent.

20 Claims, 8 Drawing Sheets

HARD DRIVE PROTECTION OVERRIDE

BACKGROUND OF THE INVENTION

1. Technical Field

The present invention relates in general to the field of computers, and in particular to protecting a computer from physical shock. Still more particularly, the present invention relates to a method and system for temporarily disabling a hard drive's physical shock protection feature.

2. Description of the Related Art

Most of the components of a computer, including a notebook Personal Computer (PC), are able to take physical shock, resulting from an event such as being dropped, without permanent damage. This is due to the semi-rigid design of the packaging (case) of the computer, and the fact that most of the critical components inside the computer are Integrated Circuit (IC) chips that have no moving parts. However, disk drives, and particularly Hard Disk Drives (HDDs) are prone to permanent damage from physical shock (impact).

To protect the HDD in a notebook PC, many HDDs are shock-mounted on rubber or gel-filled washers and corner pads. As noted above, the semi-rigid case of the notebook PC is designed to absorb energy (flex), thus providing additional impact protection. While such protection may be adequate if the read/write head on the HDD is parked and not operating above the media disk inside the HDD, the HDD is nonetheless likely to be permanently damaged if a read/write operation is occurring when the notebook PC is dropped.

To provide protection to an HDD that is dropped during a read/write operation (in which the drive head is flying over the media disk), International Business Machines (IBM®) of Armonk, N.Y., has developed a feature called Hard Drive Active Protection System (APS). APS utilizes sensors (accelerometers) that detect a dramatic change in the computer's orientation (such as being dropped, kicked, flipped, etc.). The APS uses a signal from the sensors to predict a physical shock that could potentially be transmitted through the notebook PC to the HDD and cause damage to the HDD. As the cliche goes, it's not the fall that hurts, it's the sudden stop. Thus, APS detects that the notebook PC is falling (or otherwise moving in an unhealthy manner), and predicts an imminent physical shock that is likely to permanently damage the HDD that is in a read/write mode of operation. To avoid such damage, APS suspends HDD operations by parking the read/write head of the HDD and stopping the hard drive platters from spinning (assuming that a read/write operation was occurring during the fall). The parking/stopping step takes well less than 500 milliseconds, which is typically less than the time it would take the notebook PC to fall from a user's lap to the ground. Furthermore, the APS can park/stop the HDD in response to rough jiggling, such as may occur while being held by a pedestrian user, while in a vibrating industrial environment, etc. In addition, APS can be configured to ignore small sources of vibration, such as repetitive vibrations experienced on a commuter train, that are not likely to be indicative of imminent physical shock.

Setting up APS on the notebook PC begins by setting APS to the "Enabled" mode. Once in this mode, APS behavior can be adjusted, using either a motion sensitivity slider bar on a Graphical User Interface (GUI), or by checking condition boxes. That is, a slider bar can be moved with a pointer to make the APS more or less sensitive to movement, resulting in the HDD being parked and stopped according to this sensitivity level. Alternatively, activity boxes describing general conditions for activating APS can be checked. Such conditions may include ignoring small, repetitive vibrations such as those experienced when riding on a train.

After the APS detects movement (fall, vibration, etc.) of the notebook computer that is indicative of potential shock, the HDD is stopped. When the HDD is stopped, the read/write head remains parked and software operations requiring access to the HDD cannot proceed. If the movement of the notebook computer continues to meet certain thresholds, APS will to keep the HDD read/write head parked until the computer remains stable for a predetermined amount of time. From the point in which the notebook computer is again stable, the HDD resumes in approximately 1–3 seconds depending on the situation.

While APS provides excellent protection to the HDD, human factor engineers may be concerned that users will turn off the APS feature if it is annoyingly intrusive. Accelerometer sensitivity and detection algorithms for APS are designed to protect the HDD against worst case scenarios in which the fall or vibration of the notebook computer occurs very quickly. However, APS may periodically stop the HDD in instances in which motion meets certain thresholds, but physical shock is not imminent such as when a user is walking and carrying the notebook computer with the display open (e.g. to see location of the next meeting) or when rough turbulence on airplane occurs. In these instances, HDD stoppage may become annoying as the user cannot continue with any operation that may require HDD access (e.g. opening the calendar to view meeting details). If the annoyance of periodic or unwanted HDD stoppage is too great, then there is a strong potential that the user will decide to permanently turn the APS feature off, thus losing a valuable safety feature of the computer.

What is needed, therefore, is a method and system that will allow a user to utilize APS with minimal annoyances resulting from the HDD being stopped. This may include providing a manual method for temporarily overriding APS activity or a more advanced automatic method that fine tunes APS behavior according to the habits and practices of the user. Preferably, such a method and system will cause the APS to automatically handle physically shock events in a manner prescribed by the user.

SUMMARY OF THE INVENTION

The present invention is thus directed to a method and system for overriding a hard drive Active Protection System (APS). APS automatically parks a read/write head and locks the platters in a Hard Disk Drive (HDD) in a notebook computer in response to a physical shock, such as when the computer is dropped from the user's lap or during intense vibration caused by air turbulence during a passenger flight. Rather than permanently disabling APS the present invention permits a convenient method and system for temporarily suspending the operations of the APS, thus allowing the user to still access the HDD in conditions in which motion occurs yet physical shock is not necessarily imminent.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
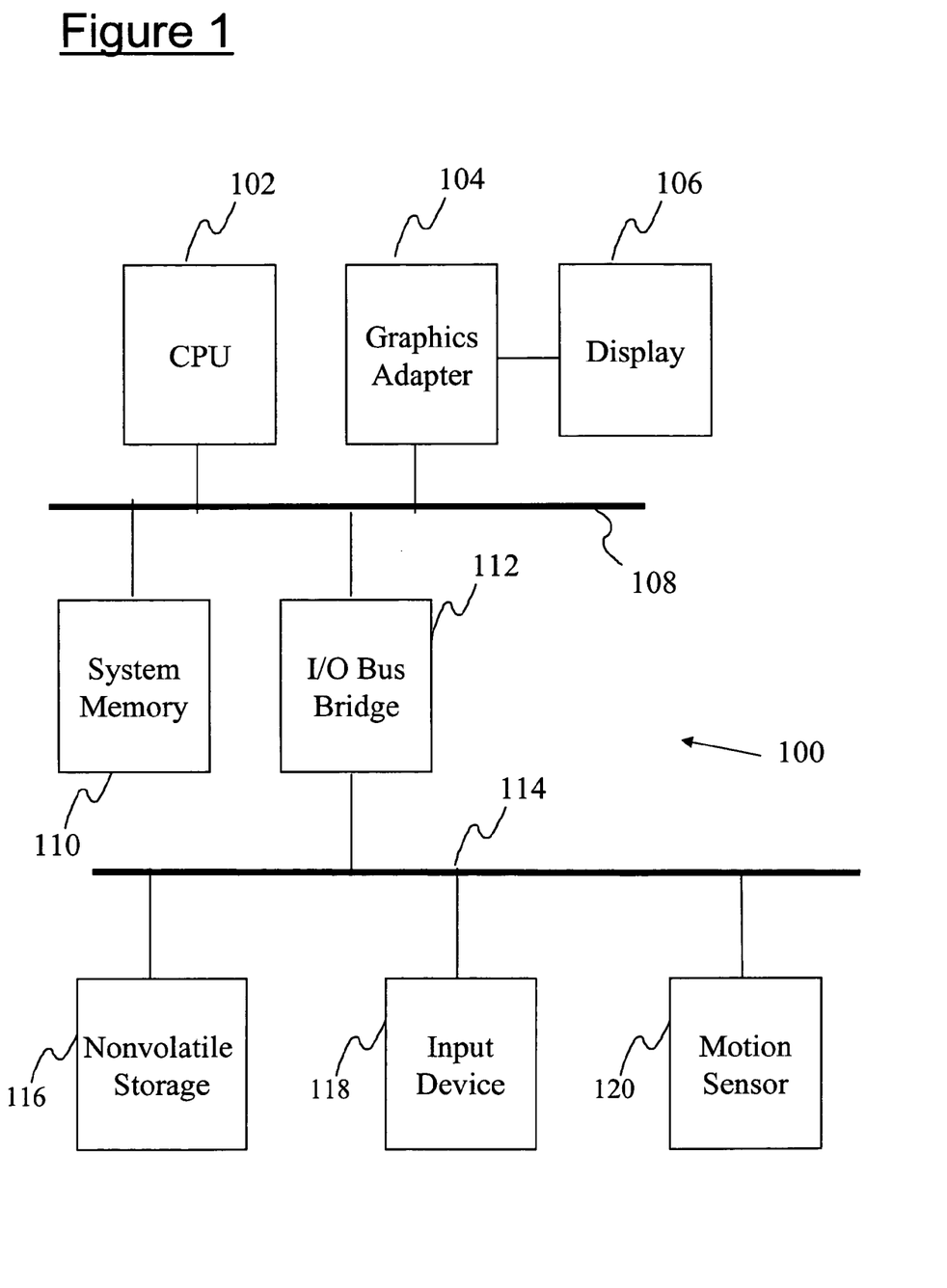
FIG. 1 depicts an exemplary computer system in which the present invention may be implemented.

With reference now to the figures, and particularly to FIG. 1a, there is depicted a block diagram of an exemplary data processing system in which a preferred embodiment of the present invention may be implemented. Data processing system 100 may be, for example, one of the models of personal or server computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

Data processing system 100 also includes a motion sensor 120. Motion sensor 120 contains one or more accelerometers. When data processing system 100 is physically moved, motion sensor 120 sends signals indicating the acceleration and direction of the movement. In a preferred embodiment, motion sensor 120 can provide three-dimensional information. For example, if data processing system 100, such as a notebook computer, starts to fall off a user's lap, the computer will start tumbling enough to permit the two accelerometers to send two signals that, when combined, will indicate the direction and acceleration at which the notebook computer is free-falling. These signals are preferably interpreted by CPU 102, but may be interpreted by another dedicated logic, including an Application-Specific Integrated Circuit (ASIC) (not shown).

Figure 2A:
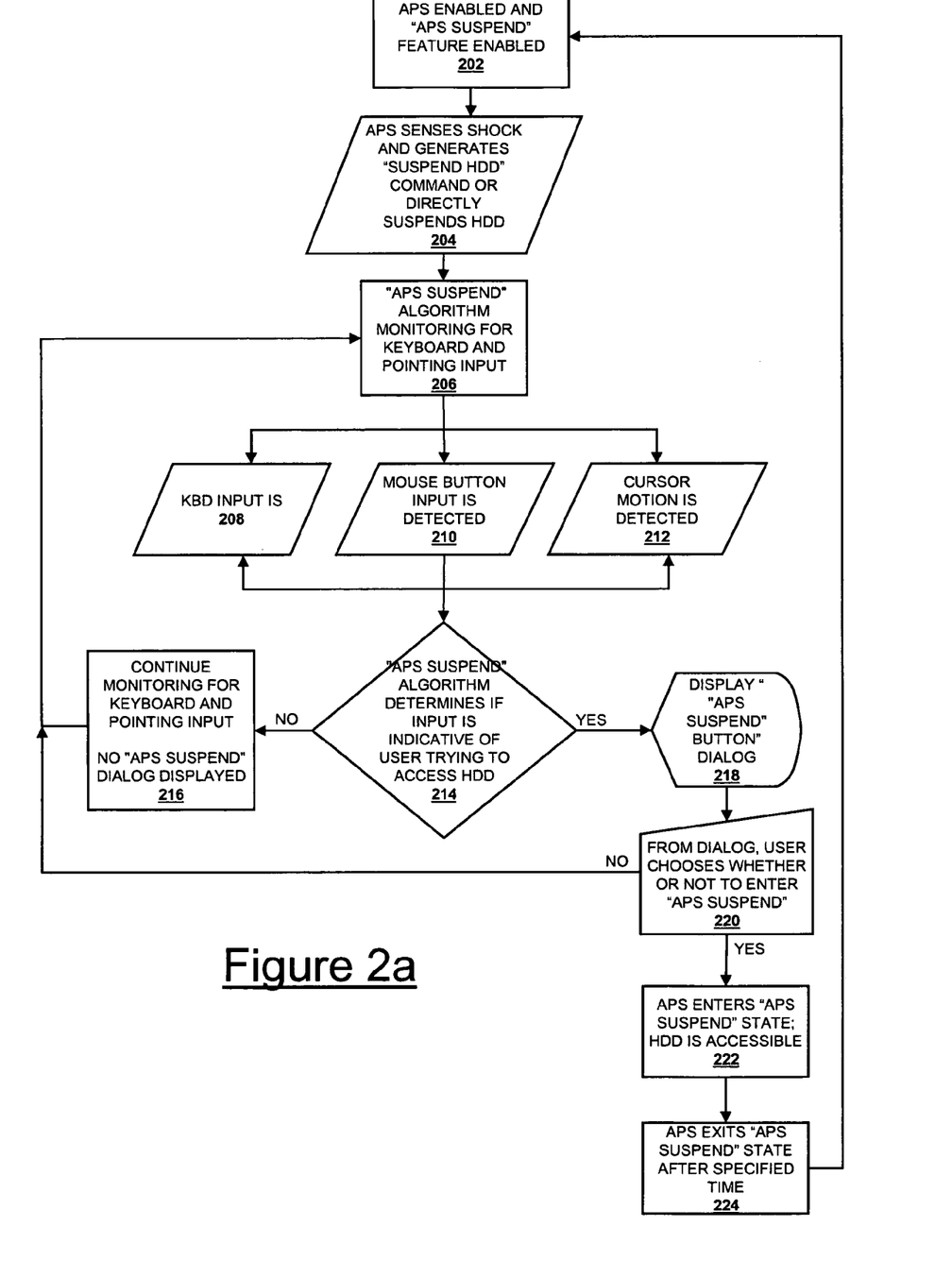
FIG. 2a is a flow chart of a preferred embodiment of the present invention in which input devices and cursor motion is monitored for an indication that an Active Protection System (APS) should be overridden, thus allowing use of a Hard Disk Drive (HDD)

Referring now to FIG. 2a, a flow-chart of steps taken in a first preferred embodiment of the present invention is presented. Starting at block 202, an Active Protection System (APS) is enabled in a computer, preferably a notebook computer. The APS detects shock events, which could result in damage to the notebook computer's hard drive (HDD), by sensing severe movement of the entire notebook computer (as may occur when the notebook computer is dropped, or is used on a bumpy train, or is used while carried by a pedestrian, etc.). The APS suspends operation of the HDD by parking the read/write head and locking (stopping rotation) of the disk platters in the HDD, thus helping to avoid physical damage to the read/write head and platters of the HDD.

In addition (at block 202), the present invention generally noted in the block as "APS SUSPEND" is enabled by the user. That is, a feature that offers the user the option of being able to selectively suspend (override) the APS according to conditions/choices described below is enabled.

At block 204, the APS senses a shock event, such as sudden downward movement, jostling, vibration, being assaulted against the computer. This shock event is preferably detected by one or more accelerometers in a motion detector, which sends a signal to a processing logic that interprets the signal and its corresponding measured shock event. By interpreting the signal from the motion detector, the processing logic determines that the shock event is potentially harmful to the HDD, and thus parks (the read/write head) and locks (the platters) the HDD.

At block 206, the "APS SUSPEND" algorithm monitors all input devices on the computer, including the keyboard (block 208) and mouse buttons (block 210). The "APS SUSPEND" algorithm also monitors for any cursor motion (block 212).

At query block 214, the "APS SUSPEND" algorithm detects an input (from the keyboard or mouse—blocks 208 and 210) or cursor movement (block 212). The "APS SUSPEND" algorithm then evaluates the input and/or cursor movement. This evaluation is based on recognizing inputs that would not normally be made if the HDD had not been parked and locked at an inopportune time. For example, assume that an application requires a read/write operation with the HDD when the "Enter" key is depressed. If the HDD is parked and locked under APS, then nothing will happen when the "Enter" key is engaged. The user, thinking that he did not fully depress the key, will likely re-press the key. If frustrated by the lack of response, the "Enter" key may be depressed several times in rapid succession. This is an indicator to the "APS SUSPEND" algorithm that the user may want to override (suspend) APS, allowing access to the HDD. Other indicative inputs may be two or more rapidly consecutive double clicks from mouse buttons, or three or more seconds of constant erratic cursor motion (indicating an attempt to wake up the computer by wiggling the mouse). The term "erratic cursor motion" is defined as that motion which is identified by the "APS SUSPEND" algorithm as being non-useful to an application. That is, "erratic cursor motion" does not invoke or enable a function of the application.

Figure 2B:
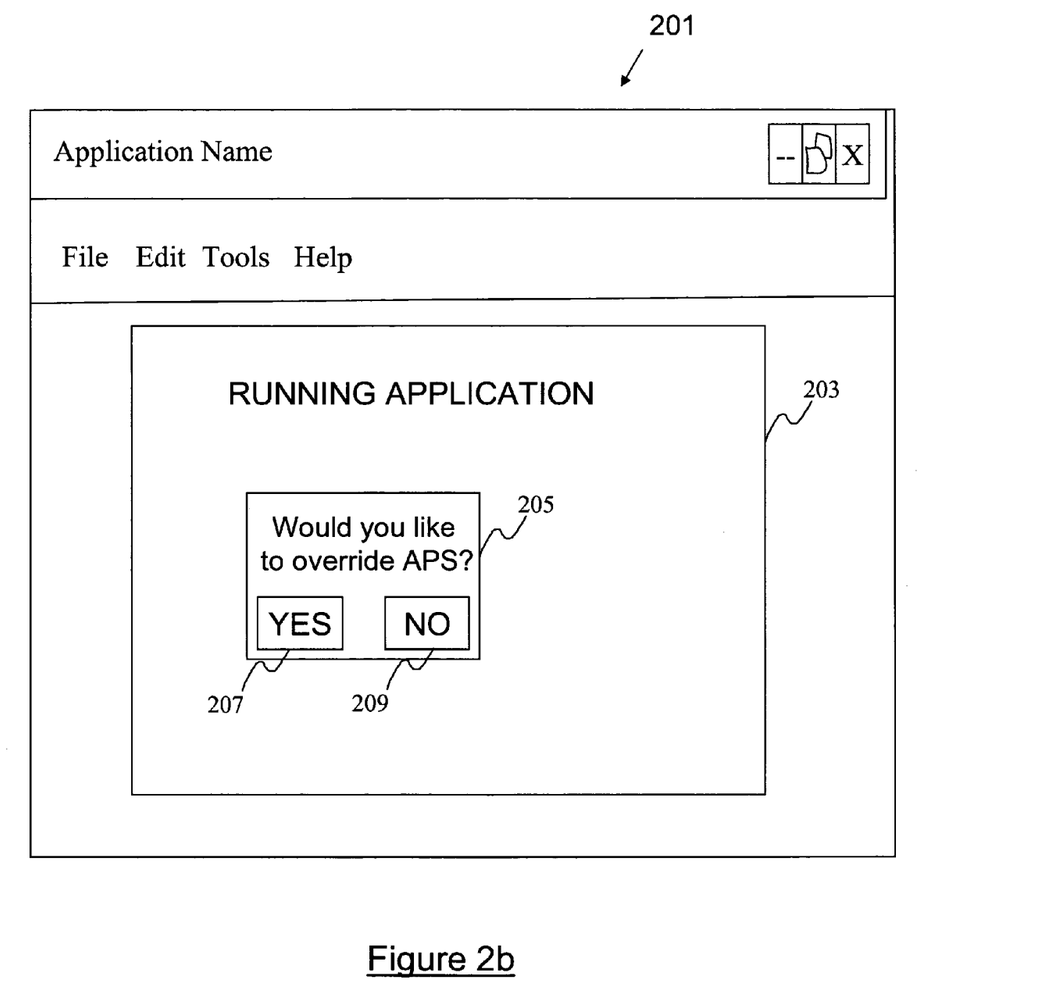
FIG. 2b illustrates an exemplary Graphical User Interface (GUI) allowing a user to manually override APS.

If none of the inputs or cursor movements indicate that the user wants to suspend APS (block 216), then nothing further happens, and the "APS SUSPEND" algorithm will continue to monitor new inputs/cursor movements. However, if "APS SUSPEND" detects an input/cursor movement indicating that the user wants the computer to unfreeze (override APS so that the HDD can be accessed), then an "APS SUSPEND BUTTON" dialog is presented (block 218) on the computer's screen, and the user decides whether to override (suspend) APS (block 220). An example of such a dialog box is shown in FIG. 2b. Consider Graphical User Interface (GUI) 201, which is displaying a running application 203. When APS has parked and locked the HDD, and yet the user needs to access the HDD (as evidenced by the user's inputs or the cursor movements described above), then a dialog box 205 is displayed, asking the user if she wants to override APS. If so, then accept button 207 is clicked; if not, then decline button 209 is clicked.

Returning now to FIG. 2a, if the user decides not to override APS (block 220) by entering "APS SUSPEND," then the HDD remains parked and locked, and the cycle continues as shown. However, if the user does decide to enter "APS SUSPEND," the APS enters into a suspend state in which the HDD is once again accessible (block 222). The HDD remains accessible (APS is suspended) for a pre-determined amount of time (block 224), after which time the HDD is once again stopped by APS. This amount of pre-determined time may be automatically set by the "APS SUSPEND" algorithm, or the time may be entered manually by the user.

In a preferred embodiment, the "APS SUSPEND" algorithm is heuristic, able to learn what the user's preferences are based on past experiences/events. To describe a preferred embodiment of this heuristic capability, reference is now made to FIG. 3a. Steps 302 through 316 are the same as described for FIG. 2a's respective steps 302 through 216 and will not be reiterated here.

Figure 3A:
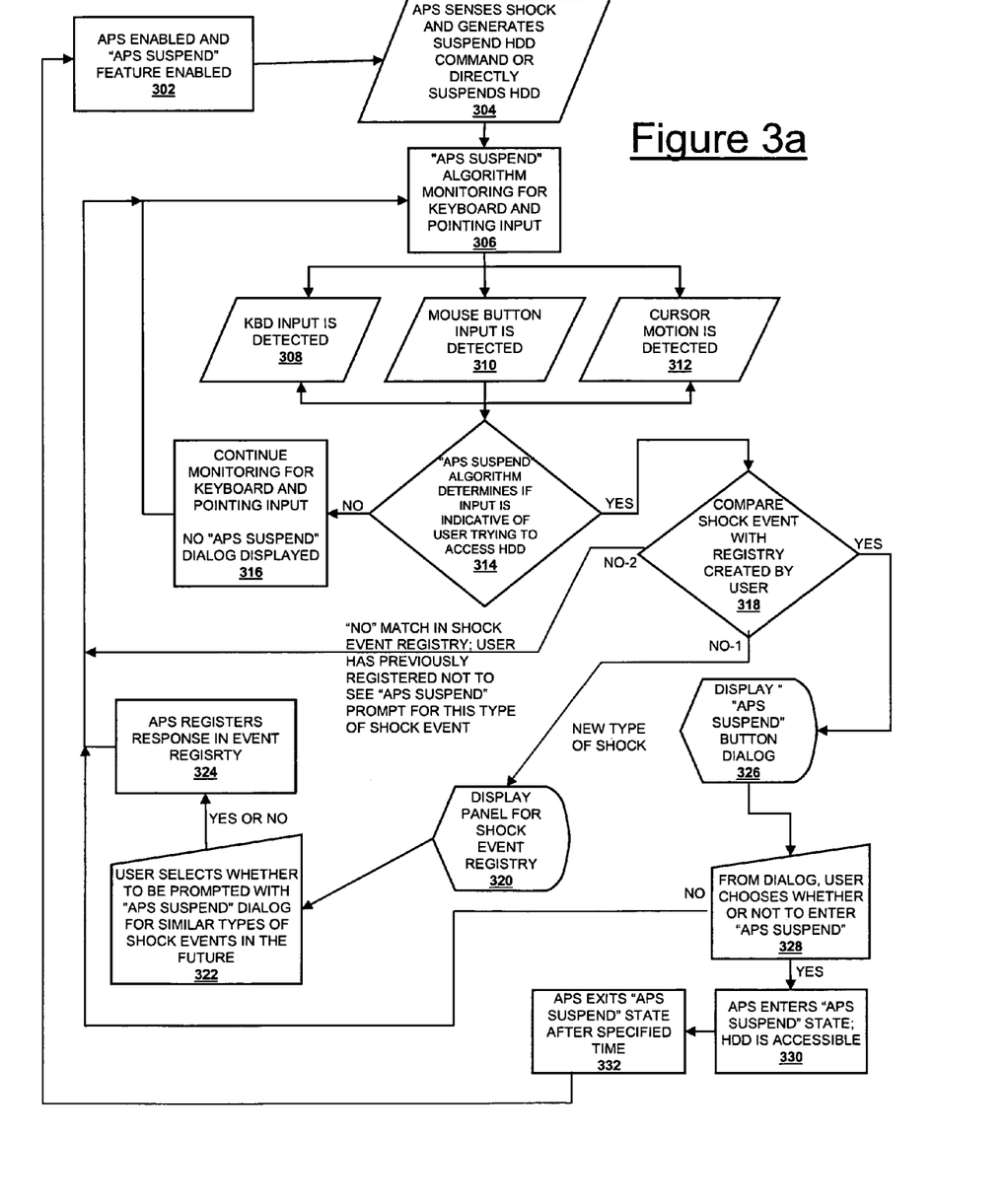
FIG. 3a is a flow chart showing a use of a shock event registry that allows an "APS SUSPEND" program to learn about a user's preferred responses to shock events and whether or not to override (suspend) APS.

If the "APS SUSPEND" algorithm determines that the user is trying to access the HDD when APS has stopped it (block 314), then the shock event that caused APS to run is compared to past shock events that have been previously stored by a user in an event registry in the computer (query block 318). Shock event details that may be compared in the registry include, but are not limited to, maximum acceleration level, direction, length time) of the movement, time of day, open software applications, previous user actions (e.g. keyboard or mouse activity).

Figure 3B:
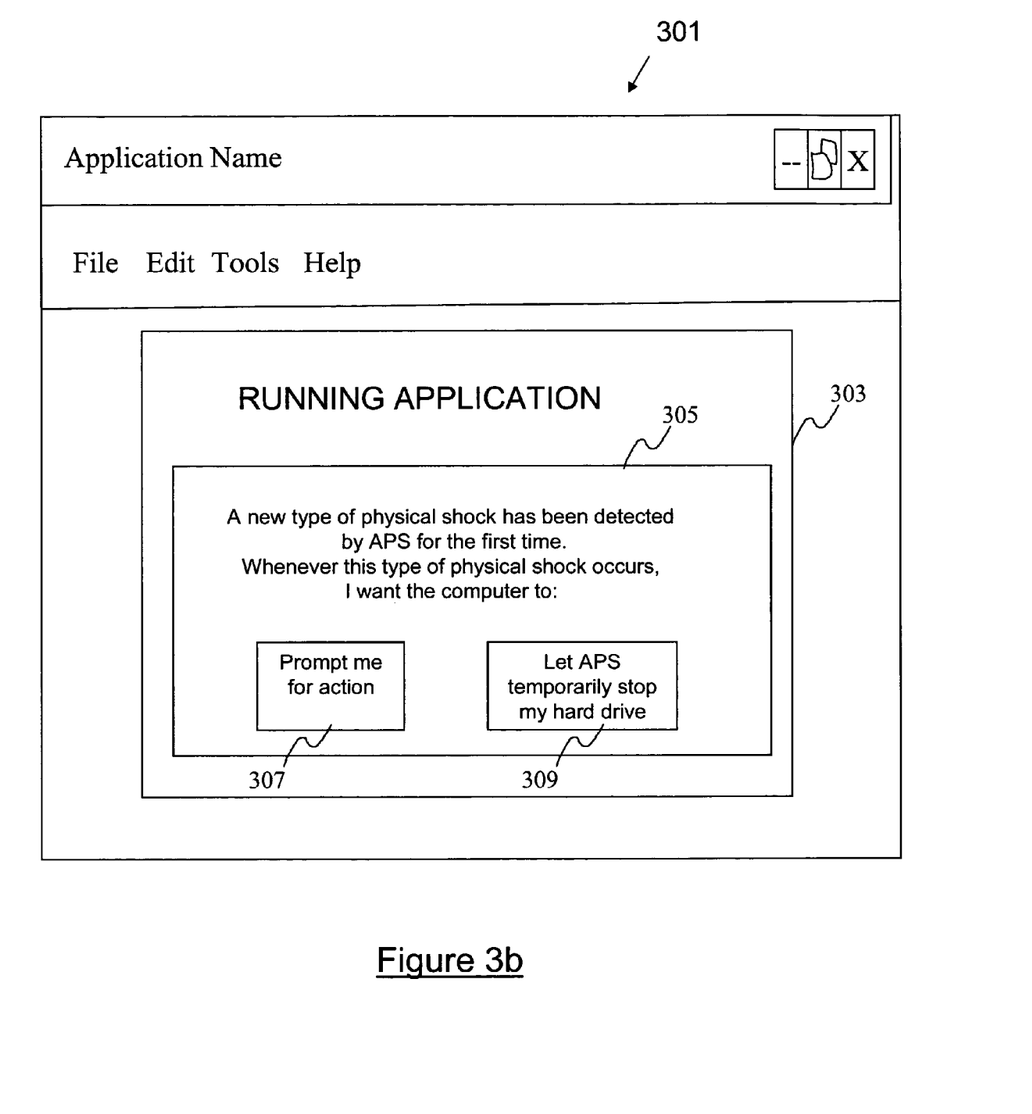
FIG. 3b depicts a GUI allowing the user to modify the shock event registry.

The past shock events in the event registry (referenced in query block 318) are those events that have been previously-recorded in the event registry at block 324. The steps taken to create and update this event registry are described in blocks 320 and 322, as well as FIG. 3b. With reference then to FIG. 3b, a GUI 301 shows a Running Application 303 that is interrupted by a display panel 305. The display panel 305 provides options to the user for how to respond to a shock event (see block 320 in FIG. 3a). A message appears in display panel 305 informing the user that a first-time shock event has occurred, and offers the user multiple options for how the computer should respond now and in the future to such an event. For example, the user may choose to always be prompted for action (button 307), such as being offered a dialog box 205 shown in FIG. 2b. Alternatively, the user may elect to let APS continue to do its job as originally designed (button 309), which is to temporarily stop (park and lock) the HDD in response to this type of shock event.

Returning again to FIG. 3a, once the user has made her selection (block 322), then the appropriate response for the future is recorded in the shock event registry (block 324).

With reference again to query block 318, there are three possible results of the comparison of the current shock event with those stored in the registry. Two of the results are "NO" and one is "YES." The first "NO" result ("NO-1") occurs when this type of shock event is a first time event, and thus the steps just described for blocks 320 through 324 are taken. The second "NO" result ("NO-2") occurs when this type of shock event has occurred before, but the user has previously registered her decision not to override APS, in which case the process goes back up to block 306.

The "YES" result occurs when the user has previously indicated that a prompt is desired for action, thus the "APS SUSPEND" button dialog is displayed (block 326), such as the dialog box 205 shown in FIG. 2b. From block 326, the user decides whether or not to suspend APS (block 328), thus potentially entering an "APS SUSPEND" state (block 330) for some pre-determined length of time (block 332).

Figure 4:
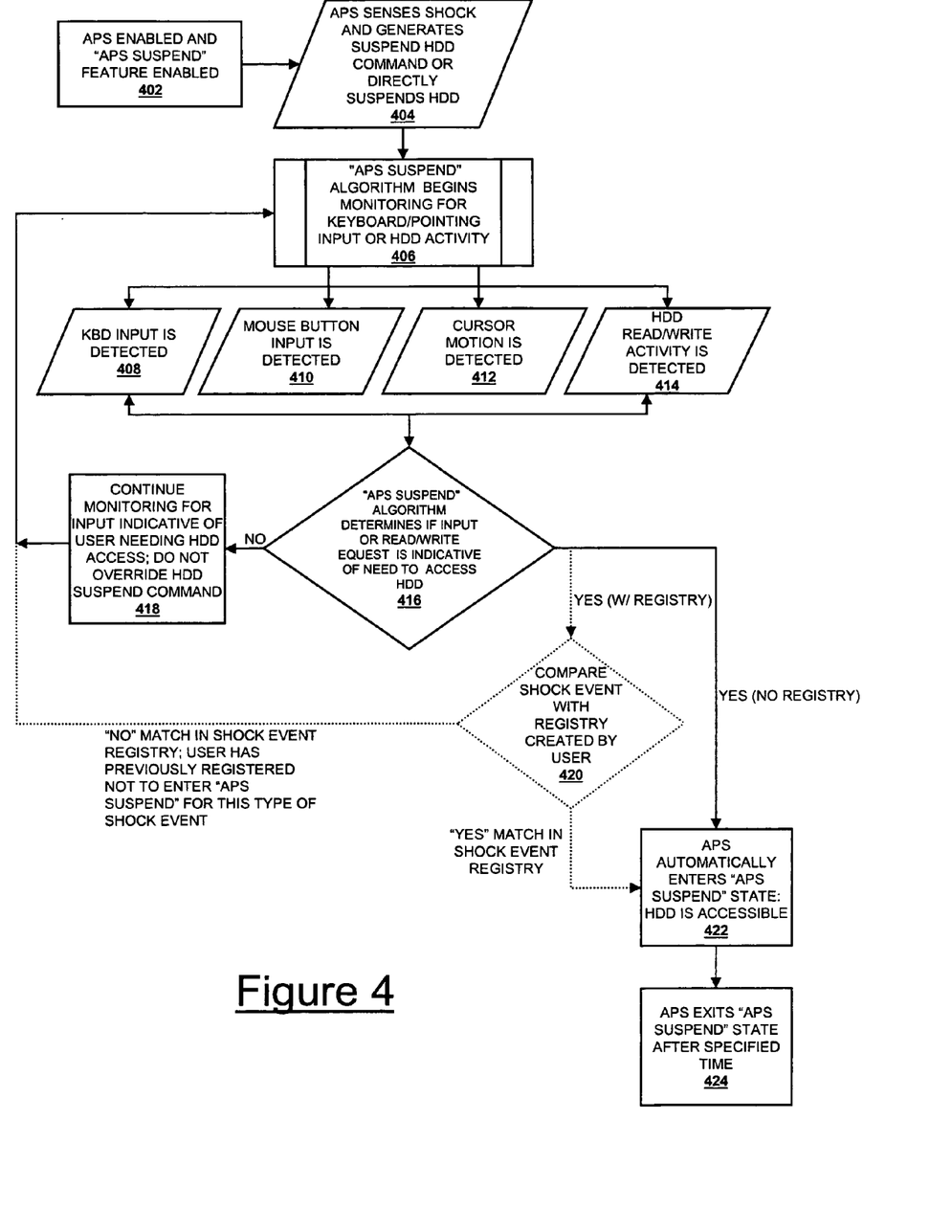
FIG. 4 is a flow-chart that includes steps for monitoring read/write requests of the HDD to prompt "APS SUSPEND"

Besides monitoring for attempted input activity while APS has parked and locked the HDD, the present invention can also monitor application and/or operating system (OS) software to determine if the HDD should be resumed (the APS overridden). With reference then to FIG. 4, the APS and "APS SUSPEND" features are enabled (block 402), allowing the APS to stop the HDD after sensing a shock event (block 404), and allowing the "APS SUSPEND" algorithm to monitor for activity that may indicate that APS should be overridden (block 406). Thus, as described in previous figures, the "APS SUSPEND" algorithm monitors the keyboard (block 408), mouse button (block 410), and cursor motion (block 412). In addition, however, the "APS SUSPEND" algorithm also monitors the I/O bus 114 shown in FIG. 1 for any request for a read or write operation from nonvolatile storage 116 (HDD). This monitoring is preferably performed by CPU 102, but may be accomplished by a special logic, including an ASIC (not shown), that monitors I/O bus 114 for such activity.

Continuing with FIG. 4, the "APS SUSPEND" algorithm determines if either attempted input activity, cursor movement, or an HDD request indicates a need to override APS (block 416). If not, then the HDD remains stopped (block 418) and any new events are monitored (block 406). However, if the "APS SUSPEND" does indicate that the APS may need to be overridden, then different steps are taken depending on whether there is a user-updated event registry, such as described in FIG. 3a. If such a registry is in effect, then the shock event is compared with the registry previously created (block 420), and APS is either overridden or not, depending on choices made by the user when setting up the registry entry that describes the present shock event. If there is not such registry, then APS is suspended for a pre-determined period of time (blocks 422 and 424). Although not shown as a step (block) in FIG. 4, before entering the "APS SUSPEND" state referenced in block 422, a prompt (such as dialog box 205 shown in FIG. 2b) may be shown to the user.

Figure 5A:
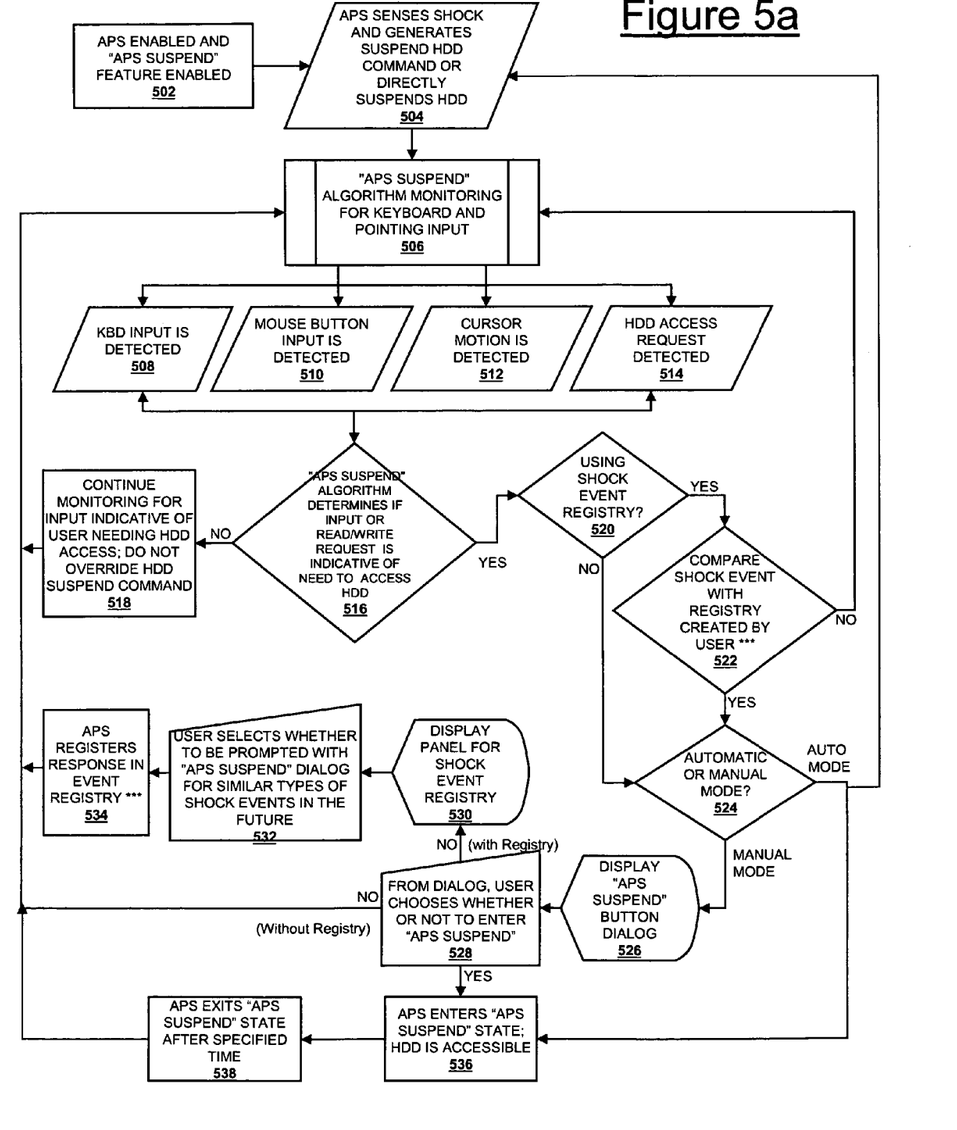
FIG. 5a is a flow-chart showing an overview of combined features of the present invention, including whether or not to automatically invoke "APS SUSPEND"

FIG. 5a provides a compilation overview of features of the present invention. Starting at block 502, APS and "APS SUSPEND" are enabled. APS senses a real-time shock event and suspends (parks/locks) the HDD (block 504). "APS SUSPEND" then monitors for activity indicative of a need to employ "APS SUSPEND" (blocks 506 and 516), including keyboard (block 508), mouse button (block 510), cursor motion (block 512), or HDD access request (block 514) activity. If such or similar activity is not detected (block 518), then the process returns to monitoring block 506. If such an event is detected, a query is made as to whether there is a shock event registry (query block 520). If so, then the recently detected shock event is compared with those defined and stored in the shock event registry (query block 522). If there is such an event recorded, then a query is made as to whether "APS SUSPEND" is in automatic or manual mode (query block 524). If there is no event registry, manual method is employed, as described above.

Figure 5B:
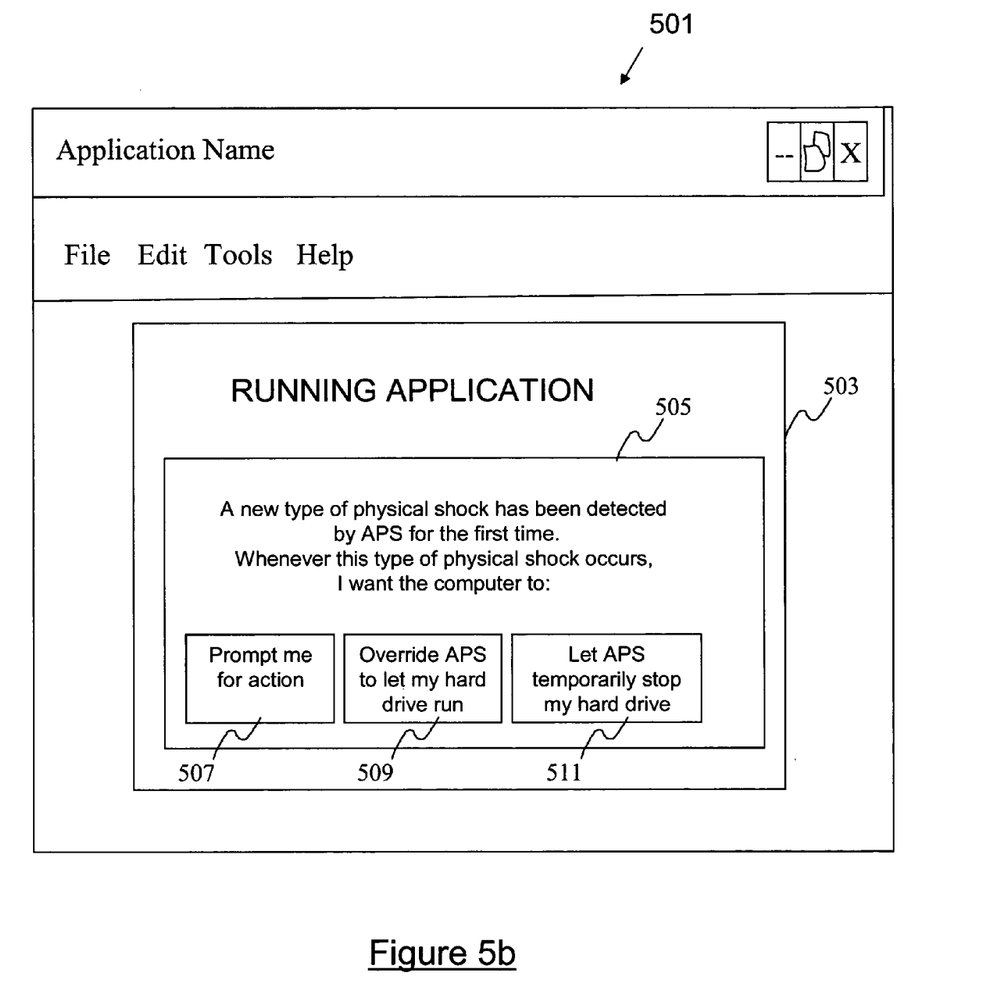
FIG. 5b illustrates a GUI that allows the user to automatically invoke "APS SUSPEND."

Whether or not "APS SUSPEND" is in the automatic or manual mode depends on a previous response by the user when updating the shock event registry. For example, with reference now to FIG. 5*b*, a GUI 501 shows a Running Application that is interrupted by a display panel 505. The display panel 505 provides options to the user for how to respond to a shock event (see block 530 in FIG. 5*a*). A message appears in display panel 505 informing the user that a first-time shock event has occurred, and offers the user multiple options on how to the computer should respond now and in the future to such an event. For example, the user may choose to always be prompted for action (button 507), such as being offered a dialog box 205 shown in FIG. 2*b*. Alternatively, the user may elect to always override the APS (button 509), thus letting the HDD continue to run unprotected from this type of shock event. Alternatively, the user may elect to let APS continue to do its job as originally designed (button 511), which is to temporarily disable (park and lock) the HDD in response to this type of shock event. Buttons 509 and 511 therefore put "APS SUSPEND" into an "automatic mode," since no further action must be taken by the user when subsequent similar shock events occur. Button 507 places "APS SUSPEND" into a "manual mode," since the user must manually decide how to respond to subsequent similar shock events.

Referring again to FIG. 5*a*, if the "APS SUSPEND" algorithm is in manual mode, then the "APS SUSPEND" button and dialog are displayed (block 526), and the user chooses whether or not to suspend APS (block 528). If the user chooses not to suspend APS, then the registry, if existent, may be updated (blocks 520, 532, and 534). If the user chooses to suspend APS, then APS is suspended for the pre-determined amount of time set by "APS SUSPEND" (blocks 536 and 538).

If the "APS SUSPEND" algorithm is in automatic mode, then APS is automatically either suspended (block 536) or allowed to run normally (block 504).

While the present invention is described as generally suspending APS, note that in a preferred embodiment critical levels of APS protection stay in place even when "APS SUSPEND" is activated. That is, even while "APS SUSPEND" suspends APS protection for most physical shock events, there are some shock events that have a high risk of causing permanent damage to the HDD. Such events include movement indicative of a quick drop of the notebook PC, being subjected to vibration forces so excessive as to certainly damage the HDD, et al. Thus, even when the computer is in "APS SUSPEND" mode, APS continues to monitor for such certain catastrophic events, and will override "APS SUSPEND" to stop and protect the HDD. Acceleration and movement thresholds for potential catastrophic events are pre-determined and will automatically trigger APS to override of the "APS SUSPEND" function.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Note again that for the purposes of the claims, the term "shock event" is defined as a physical movement of a computer that may potentially damage the HDD in the computer. Examples of such shock events include, but are not limited to, the computer being operated in a highly vibratory environment, such as may be found on various forms of public transportation, or the computer being dropped from a work surface or lap, or when computer is jostled or dropped while being held by a user who is walking.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    enabling a hard drive active protection system, the hard drive active protection system being capable of suspending operation of a hard drive in a computer when the computer is subjected to a shock event that is potentially harmful to the hard drive;
    sensing a real-time shock event that is potentially harmful to the hard drive;
    in response to sensing the real-time shock event that is potentially harmful to the hard drive, suspending operation of the hard drive with the hard drive active protection system;
    determining that access to the hard drive is needed while the operation of the hard drive is suspended; and
    in response to determining that access to the hard drive is needed while the operation of the hard drive is suspended, overriding the hard drive active protection system to permit the hard drive to function normally.

2. The method of claim 1, wherein a determination as to whether the hard drive active protection system should be overridden is made according to an input selected by a user from a dialog options box that is prompted by the real-time shock event.

3. The method of claim 2, wherein the determination to override the hard drive active protection system is made by:
    determining that the real-time shock event is equivalent to a previously recorded shock event;
    reading the user's input selected from the dialog options box for the previously-recorded shock event; and
    in response to determining that the user chose to override the hard drive active protection system for the previously-recorded shock event, overriding the hard drive protection system for the real-time shock event.

4. The method of claim 1, wherein the determination that access to the hard drive is needed is made by identifying multiple inputs from a key on a keyboard.

5. The method of claim 1, wherein the determination that access to the hard drive is needed is made by identifying multiple successive double-clicks of a mouse button.

6. The method of claim 1, wherein the determination that access to the hard drive is needed is made by identifying erratic cursor movement.

7. The method of claim 1, wherein the determination that access to the hard drive is needed is made by identifying a software request for a read/write operation by the hard drive.

8. A system comprising:
   means for enabling a hard drive active protection system, the hard drive active protection system being capable of suspending operation of a hard drive in a computer when the computer is subjected to a shock event that is potentially harmful to the hard drive;
   means for sensing a real-time shock event that is potentially harmful to the hard drive;
   means for in response to sensing the real-time shock event that is potentially harmful to the hard drive, suspending operation of the hard drive with the hard drive active protection system;
   means for determining that access to the hard drive is needed while the operation of the hard drive is suspended; and
   means for in response to determining that access to the hard drive is needed while the operation of the hard drive is suspended, overriding the hard drive active protection system to permit the hard drive to function normally.

9. The system of claim 8, wherein the determination as to whether the hard drive active protection system should be suspended is made according to an input selected by a user from a dialog options box that is prompted by the real-time shock event.

10. The system of claim 9, wherein the determination to override the hard drive active protection system is made by:
    determining that the real time shock event is equivalent to a previously recorded shock event;
    reading the user's input selected from the dialog options box for the previously-recorded shock event; and
    in response to determining that the user chose to override the hard drive active protection system for the previously-recorded shock event, overriding the hard drive protection system for the real-time shock event.

11. The system of claim 8, wherein the determination that access to the hard drive is needed is made by identifying multiple inputs from a key on a keyboard.

12. The system of claim 8, wherein the determination that access to the hard drive is needed is made by identifying multiple successive double-clicks of a mouse button.

13. The system of claim 8, wherein the determination that access to the hard drive is needed is made by identifying erratic cursor movement.

14. The system of claim 8, wherein the determination that access to the hard drive is needed is made by identifying a software request for a read/write operation by the hard drive.

15. The system of claim 8, wherein the system is a notebook computer.

16. A computer readable medium encoded with a computer program, comprising:
    program code for enabling a hard drive active protection system, the hard drive active protection system being capable of suspending operation of a hard drive in a computer when the computer is subjected to a shock event that is potentially harmful to the hard drive;
    program code for sensing a real-time shock event that is potentially harmful to the hard drive;
    program code for, in response to sensing the real-time shock event that is potentially harmful to the hard drive, suspending operation of the hard drive with the hard drive active protection system;
    program code for determining that access to the hard drive is needed while the operation of the hard drive is suspended; and
    program code for, in response to determining that access to the hard drive is needed while the operation of the hard drive is suspended, overriding the hard drive active protection system to permit the hard drive to function normally.

17. The computer readable medium of claim 16, wherein the determination as to whether the hard drive active protection system should be suspended is made according to an input selected by a user from a dialog options box that is prompted by the real-time shock event.

18. The computer readable medium of claim 17, wherein the determination to override the hard drive active protection system is made by:
    determining that the real-time shock event is equivalent to a previously-recorded shock event;
    reading the user's input selected from the dialog options box for the previously-recorded shock event; and
    in response to determining that the user chose to override the hard drive active protection system for the previously-recorded shock event, overriding the hard drive protection system for the real-time shock event.

19. The computer readable medium of claim 16, wherein the determination that access to the hard drive is needed is made by identifying erratic cursor movement.

20. The computer readable medium of claim 16, wherein the determination that access to the hard drive is needed is made by identifying a software request for a read/write operation by the hard drive.

* * * * *